US009036168B2

(12) United States Patent
Uchida (10) Patent No.: US 9,036,168 B2
(45) Date of Patent: May 19, 2015

(54) IMAGE FORMING APPARATUS STORING A STYLUS PEN

(71) Applicant: Satomi Uchida, Toyohashi (JP)

(72) Inventor: Satomi Uchida, Toyohashi (JP)

(73) Assignee: KONICA MINOLTA BUSINESS TECHNOLOGIES, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 13/655,727

(22) Filed: Oct. 19, 2012

(65) Prior Publication Data

US 2013/0107303 A1 May 2, 2013

(30) Foreign Application Priority Data

Oct. 28, 2011 (JP) .................................. 2011-237139

(51) Int. Cl.
*G06F 3/12* (2006.01)
*G09B 7/00* (2006.01)
*G06F 3/041* (2006.01)
*G09F 3/00* (2006.01)
*G03G 15/00* (2006.01)
*G06F 1/16* (2006.01)
*G06F 3/0354* (2013.01)

(52) U.S. Cl.
CPC .......... *G03G 15/5016* (2013.01); *G06F 1/1626* (2013.01); *G06F 2200/1632* (2013.01); *G06F 3/03545* (2013.01)

(58) Field of Classification Search
None
See application file for complete search history.

(56) References Cited

U.S. PATENT DOCUMENTS

| 5,422,442 A * | 6/1995 | Gouda et al. ................ 178/19.01 |
| 8,358,964 B2 * | 1/2013 | Radtke et al. .................. 434/353 |
| 2007/0013675 A1 | 1/2007 | Nitobe et al. |
| 2008/0313940 A1 * | 12/2008 | Chen ............................... 40/334 |

(Continued)

FOREIGN PATENT DOCUMENTS

| CN | 101431584 A | 5/2009 |
| JP | 54-77641 U | 6/1979 |

(Continued)

OTHER PUBLICATIONS

Office Action (Decision to Grant a Patent) issued on Nov. 5, 2013, by the Japanese Patent Office in corresponding Japanese Patent Application No. 2011-237139, and an English Translation of the Office Action. (3 pages).

(Continued)

*Primary Examiner* — Fred Guillermety
*Assistant Examiner* — Frantz Bataille
(74) *Attorney, Agent, or Firm* — Buchanan Ingersoll & Rooney PC (57) ABSTRACT

Disclosed is an image forming apparatus provided with an operation panel receiving instructions from a user by touch operations, a stylus pen used to perform the touch operations, and a pen holder holding the stylus pen, the pen holder including an opening for insertion of the stylus pen from outside of the pen holder, and a storage section storing the stylus pen. The storage section includes a first hollow portion with a first bottom and a second hollow portion with a second bottom lower than the first bottom. The stylus pen is stored in the storage section by being inserted through the opening, proceeding along the first bottom to enter the second hollow portion, and slanting, upon a center of gravity of the stylus pen passing a boundary between the first bottom and the second bottom, so that a tip of the stylus pen points downwards.

20 Claims, 6 Drawing Sheets

(56) References Cited

U.S. PATENT DOCUMENTS

2009/0122326 A1   5/2009  Chiba et al.
2012/0274957 A1*  11/2012 Sugiura et al. ................. 358/1.9

FOREIGN PATENT DOCUMENTS

| JP | 57-109403  | U | 7/1982  |
| JP | 63-204282  | A | 8/1988  |
| JP | 09-269864  | A | 10/1997 |
| JP | 11-305928  | A | 11/1999 |
| JP | 2007-004592 | A | 1/2007 |
| JP | 2008-149676 | A | 7/2008 |
| JP | 2009-033592 | A | 2/2009 |
| JP | 2009-175780 | A | 8/2009 |

OTHER PUBLICATIONS

The First Office Action issued on Oct. 10, 2014, by the State Intellectual Property Office of the People's Republic of China in corresponding Chinese Patent Application No. 201210405232.6, and an English Translation of the Office Action. (15 pages).

\* cited by examiner

IMAGE FORMING APPARATUS STORING A STYLUS PEN

This application is based on an application No. 2011-237139 filed in Japan, the contents of which are hereby incorporated by reference.

BACKGROUND OF THE INVENTION (1) Field of the Invention

The present invention relates to an image forming apparatus, and in particular to a structure for storing a stylus pen for an operation panel.

(2) Description of Related Art

In recent years, image forming apparatuses, such as printers, commonly have a touchscreen operation panel that allows for a variety of commands and settings to be made by directly contacting the display screen.

Such image formation apparatuses may come with a stylus pen so that the user can accurately touch a desired display item on a display screen of an operation panel when the display screen is crowded with a number of display items.

Such a stylus pen is normally stored within or near the operation panel. For example, Japanese Patent Application Publication No. 2009-175780 (hereinafter referred to as Patent Literature 1) discloses an image forming apparatus in which a clamping member is provided at the top of the operation panel and the stylus pen is removably stored within the clamping member.

In Japanese Patent Application Publication No. 2009-33592 (hereinafter referred to as Patent Literature 2), a concavity is provided at the top of the housing in the image forming apparatus, and the stylus pen is placed in the concavity.

In a structure in which the stylus pen is clamped by a clamping member, as in the image forming apparatus in Patent Literature 1, some amount of force is necessary to remove the stylus pen from the clamping member. This structure can therefore not be considered convenient for users who wish to use the stylus pen immediately. The same is true when returning the stylus pen to the clamping member.

Furthermore, in Patent Literature 1, the stylus pen is entirely exposed while stored, thus complicating the area around the operation panel and making the image forming apparatus aesthetically unpleasing.

Meanwhile, in Patent Literature 2, the stylus pen is simply placed in a concavity, and therefore the stylus pen may fall out of place if, for example, the image forming apparatus vibrates intensely. This leads to the problem of the stylus pen being easily lost. As is the case with Patent Literature 1, the entire stylus pen is also exposed, which detracts from the appearance of the image forming apparatus.

SUMMARY OF THE INVENTION

The present invention has been conceived in light of the above problems, and in the context of image forming apparatuses provided with a stylus pen, it is an object of the present invention to provide an image forming apparatus including a pen holder that does not detract from appearance or usability and that prevents the stylus pen from falling out of place and becoming lost.

In order to achieve the above object, an image forming apparatus according to an aspect of the present invention comprises an operation panel receiving instructions from a user by touch operations; a stylus pen used to perform the touch operations; and a pen holder holding the stylus pen, the pen holder including an opening for insertion of the stylus pen from outside of the pen holder, and a storage section storing the stylus pen, wherein the storage section includes a first hollow portion with a first bottom and a second hollow portion with a second bottom lower than the first bottom, and the stylus pen is stored in the storage section by being inserted through the opening, proceeding along the first bottom to enter the second hollow portion, and slanting, upon a center of gravity of the stylus pen passing a boundary between the first bottom and the second bottom, so that a tip of the stylus pen points downwards.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings.

DESCRIPTION OF THE PREFERRED EMBODIMENTS

The following describes an embodiment of an image forming apparatus according to the present invention. By way of example, the embodiment is an electrophotographic copier.

Figures 1A, 1B:
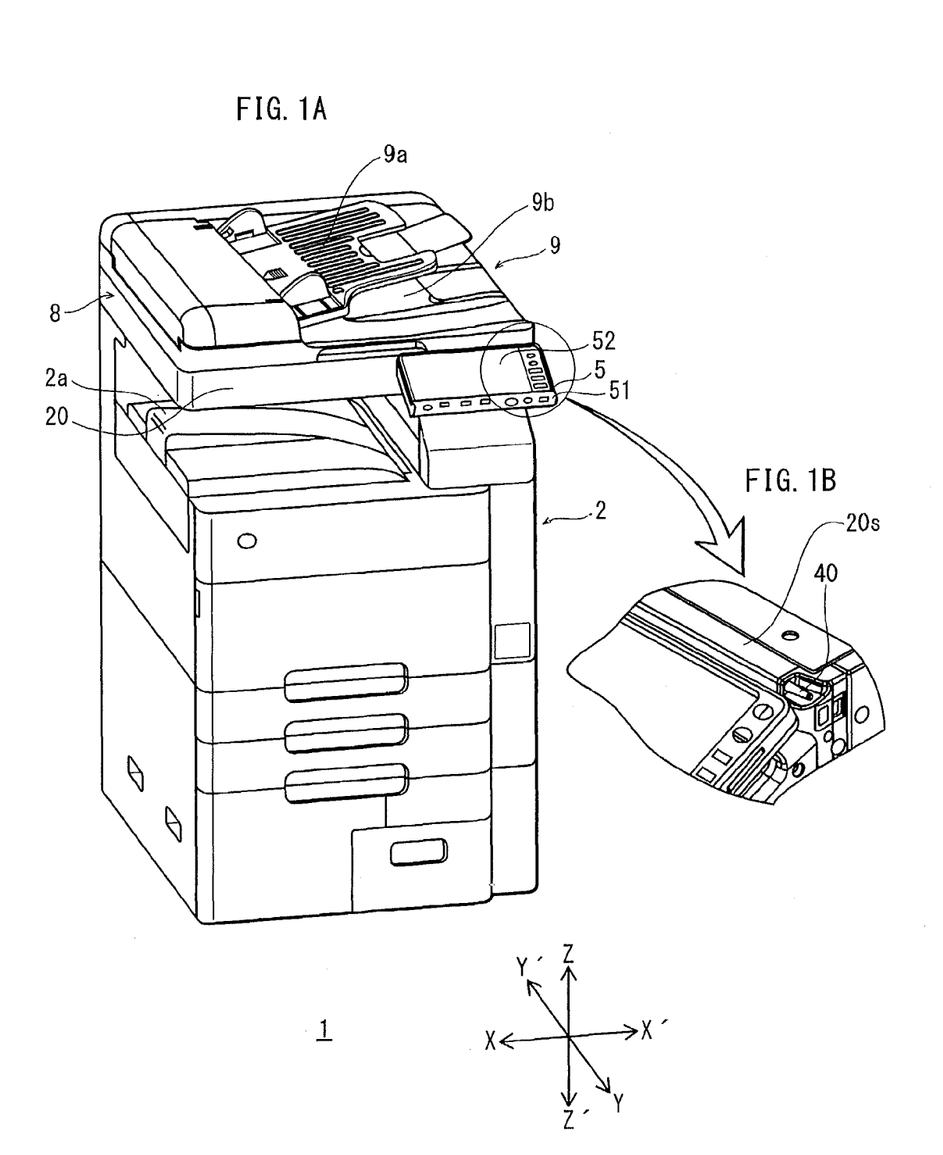
FIG. 1A is a perspective view showing the structure of a copier according to an embodiment of the present invention.
FIG. 1B is an enlarged view of the principal section.

FIG. 1A is a perspective view of a copier 1, and FIG. 1B is an enlarged view showing the location for storage of the stylus pen.

As shown in FIGS. 1A and 1B, in the copier 1, an image reading unit 8 and the document transport unit 9 are stacked in this order on top of a print unit 2.

The copier 1 is a so-called in-body paper discharging type that uses the space between the print unit 2 and the image reading unit 8 for a paper discharge tray 2a.

The document transport unit 9 is used when performing so-called sheet through image reading, whereby an image is read while a document is being transported. The document transport unit 9 picks up one sheet at a time from the top of a stack of documents in a document supply tray 9a, transports the sheet to a document reading position in the image reading unit 8, and then ejects the sheet into a document discharge tray 9b.

The image reading unit 8 has a well-known structure for generating image data: the image reading unit 8 is provided with a light source (not shown in the figures) and a scanner (not shown in the figures) that includes folding mirrors. A CCD sensor (not shown in the figures) is caused to receive, via an optical lens, light from a document image reflected by the folding mirrors.

The print unit 2 is based on electrophotography. By performing a sequence of operations for exposure of a photoconductor drum, development, primary transfer, secondary transfer, fixing, and so forth, the print unit 2 prints image data output by the image reading unit 8 onto a sheet and ejects the sheet into an in-body paper discharge tray 2a provided at the top of the housing.

An operation panel 5 is also attached to a case 20 (main body) of the image reading unit 8 in the copier 1 according to the present embodiment. The operation panel 5 protrudes forward from the case 20. In the case 20, at the back of the operation panel 5 in the Y' direction thereof, a pen holder 20s for holding a stylus pen 40 is provided, as illustrated in FIG. 1B. The stylus pen 40 is used to operate the display panel 52.

The pen holder 20s is placed near the operation panel 5 so that when looking at the operation panel 5, the user will quickly notice the stylus pen 40. This configuration is therefore user-friendly.

The operation panel 5 includes a touchscreen display panel 52 and an operation panel main body 51 provided with mechanical buttons.

Figure 2A:
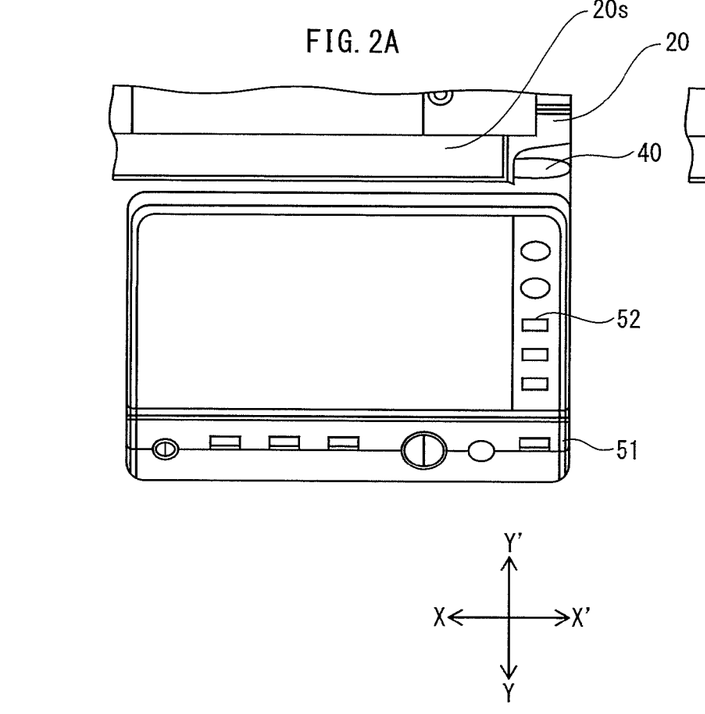
FIGS. 2A and 2B show operations of the display panel in an operation panel provided in the copier.
Figure 2B:
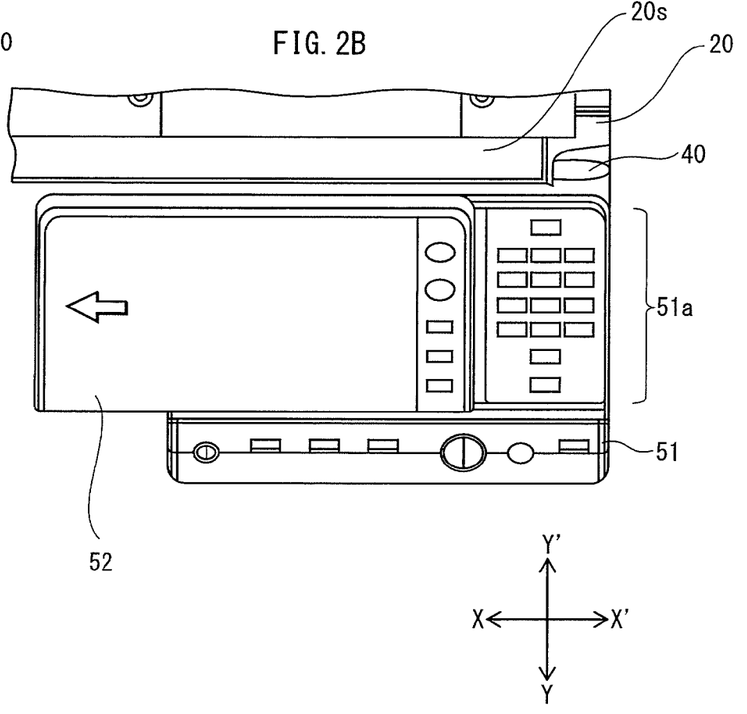

FIGS. 2A and 2B are views of the operation panel 5 from above.

The display panel 52 is provided overlapped on top of the operation panel main body 51 and is slidable along the x-axis. Normally, as shown in FIG. 2A, when viewed from above (along the z-axis), the operation panel main body 51 and the display panel 52 are in overlap (i.e. the operation panel main body 51 and the display panel 52 overlap to a great degree; hereinafter, this is referred to as the "closed state" of the display panel 52).

When the display panel 52 is in the closed state, the user can input operations by touching icons or messages displayed on the display panel 52 with a finger or with the stylus pen 40.

Users who are not used to performing such touch operations can slide the display panel 52 from the closed state in the direction of the arrow (along the x-axis), as illustrated in FIG. 2B, thus placing the operation panel main body 51 and the display panel 52 in a state with little overlap (hereinafter referred to as the "open state" of the display panel 52). Switching the display panel 52 to the open state reveals a numeric keypad 51A through which operations may be input.

Figure 3:
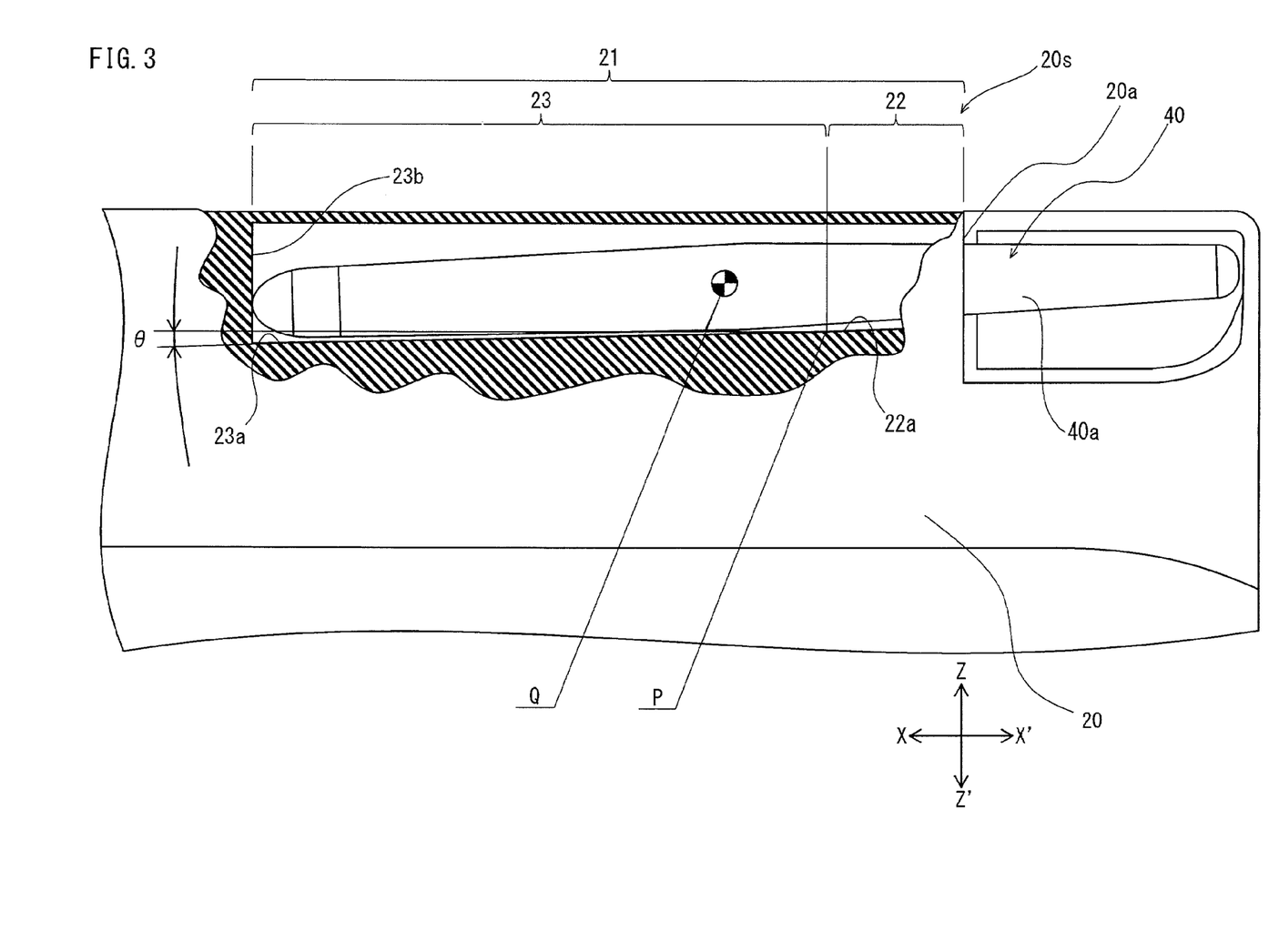
FIG. 3 is a partially cutaway diagram showing the structure of a storage section for the stylus pen provided in the copier.

FIG. 3 is a partial cross-section diagram of the pen holder 20s for the stylus pen 40 as viewed from the front of the image forming apparatus.

Figure 4A:
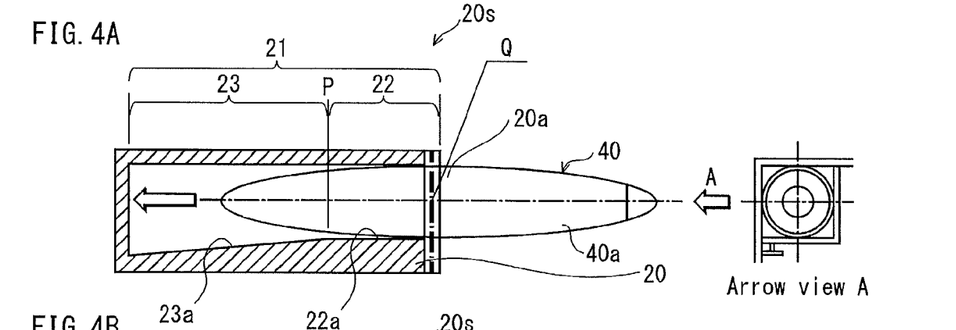
FIGS. 4A and 4B are schematic diagrams illustrating how the stylus pen slants when stored in the storage section.
Figure 4B:
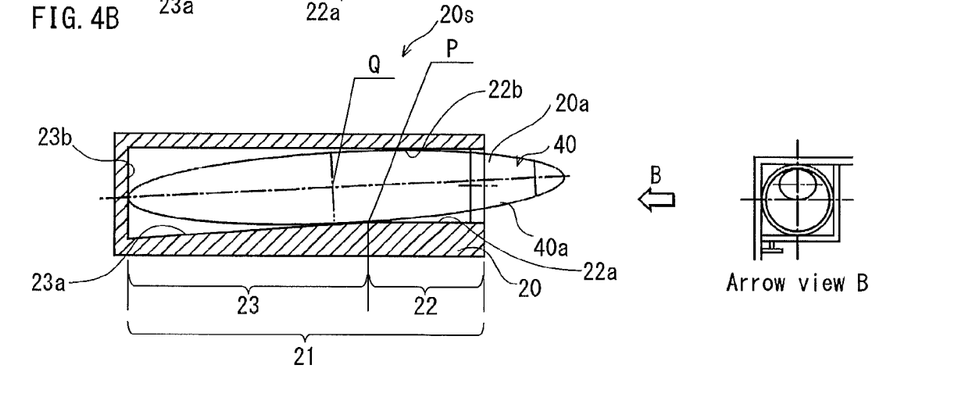

FIGS. 4A and 4B are schematic diagrams from the start of storage to the completion of storage of the stylus pen 40, illustrating how the stylus pen 40 slants.

The pen holder 20s includes an opening 20a in the case 20 for insertion of the stylus pen 40, as well as a storage section 21 composed of a first hollow portion 22 in communication with the opening 20a and a second hollow portion 23 adjacent to the first hollow portion 22.

A bottom 22a of the first hollow portion 22 is horizontal, whereas a bottom 23a of the second hollow portion 23 is inclined vertically downwards from an edge of the bottom 22a along the x-axis (hereinafter referred to as a "boundary P"), so as to form an angle of θ degrees with respect to the horizon.

In the copier 1 of the present embodiment, it is preferable that the value of the angle θ be at least 5° out of consideration of vibration by the image forming apparatus and in order to prevent the stylus pen 40 from falling out of place when the image forming apparatus is moved. On the other hand, in order for the user to be able to smoothly remove the stylus pen 40 in a nearly horizontal direction, and to store the stylus pen 40 compactly within the case 20 without taking up vertical space, it is preferable that the angle θ be 1° or less. In the present embodiment, an angle of 3° is adopted.

With the above structure, when the stylus pen 40 is inserted in the opening 20a as illustrated in FIG. 4A, the stylus pen 40 first proceeds along the bottom 22a of the first hollow portion 22, then entering the second hollow portion 23 whose bottom 23a gradually becomes lower than the bottom 22a.

Subsequently, once the center of gravity Q of the stylus pen 40 passes the boundary P between the bottom 22a and the bottom 23a, as illustrated in FIG. 4B, the stylus pen 40 naturally slants, with the tip of the stylus pen 40 pointing downwards. The center of gravity Q thus moves to a lower position. The tip then comes into contact with a sidewall 23b in the second hollow portion 23, so that the stylus pen 40 is set in position along the x-axis, with the back end of the stylus pen 40 exposed through the opening 20a. At this point, storage is complete.

The user can easily see the exposed edge of the stylus pen 40 from the operating position, allowing the user to rapidly grasp the exposed edge in order to withdraw the stylus pen 40 for use.

Furthermore, with the present embodiment, when the operation panel 5 is viewed from the front, the back end of the stylus pen 40 projects to the right, thus providing a configuration that is easy for people who are right-handed to use.

Note that the stylus pen 40 has a terminal section 40a extending from the center of gravity Q to the back end (FIG. 3). The outside diameter of the terminal section 40a progressively decreases towards the back end of the stylus pen 40. The stylus pen 40 thus has an overall spindle-like shape, so that when the stylus pen 40 is inserted, a ceiling 22b of the first hollow portion 22 does not interfere with the portion of the stylus pen 40 towards the back end, which would prevent the stylus pen 40 from slanting (see the arrow view B in FIG. 4B).

It is therefore possible to set the height of the hollow portion in the first hollow portion 22 to be low, thereby contributing to making the image forming apparatus a compact size.

Even if a force is produced, for example by vibration of the image forming apparatus, that might cause the stylus pen 40 to fall out of the pen holder 20s, the center of gravity Q would have to overcome the boundary P between the bottom 22a of the first hollow portion 22 and the bottom 23a of the second hollow portion 23. This structure thus prevents the stylus pen 40 from falling out.

With the above structure, the stylus pen 40 is retained within the storage section at a slight downward inclination with respect to the horizon due to the effect of gravity, thus making it difficult for the stylus pen 40 to fall out of the opening 20a. At the same time, even though the stylus pen 40 of the present embodiment is shaped like a spindle and would therefore be unstable when placed on a level surface, the tip of the stylus pen 40 comes into contact with the sidewall 23b, and the thickest portion of the stylus pen 40 is in contact with the bottom 23a of the second hollow portion 23. As a result, even if the image forming apparatus vibrates, the stylus pen 40 does not rattle.

Furthermore, the stylus pen 40 is not clamped, but rather is held in place stably by slanting due to the effect of gravity. Therefore, it is extremely easy to insert and withdraw the stylus pen 40, which improves usability.

Moreover, while stored, only a small portion of the stylus pen 40 is exposed, thus reducing the risk of detracting from the appearance of the image forming apparatus when the stylus pen 40 is stored.

Additionally, the stylus pen 40 is held in place entirely by the internal structure of the storage section 21. It is therefore not necessary to provide a separate clamp for holding the stylus pen 40, which reduces costs.

As described above, the display panel 52 can be slid open in the direction of the x-axis with respect to the operation panel main body 51 (towards the left when viewing the image forming apparatus from the front), whereas the stylus pen 40 is extracted in the opposite direction, to the right. The display panel 52 therefore does not get in the way when open, so that the display panel 52 does not block insertion or extraction of the stylus pen 40.

Modifications

The present invention is not limited to the above-described embodiment. For example, the following modifications may be adopted.

(1) In the embodiment, the bottom of the second hollow portion 23 in the storage section 21 is inclined at an angle θ with respect to the horizon, the present invention is not limited in this way.

Figure 5A:
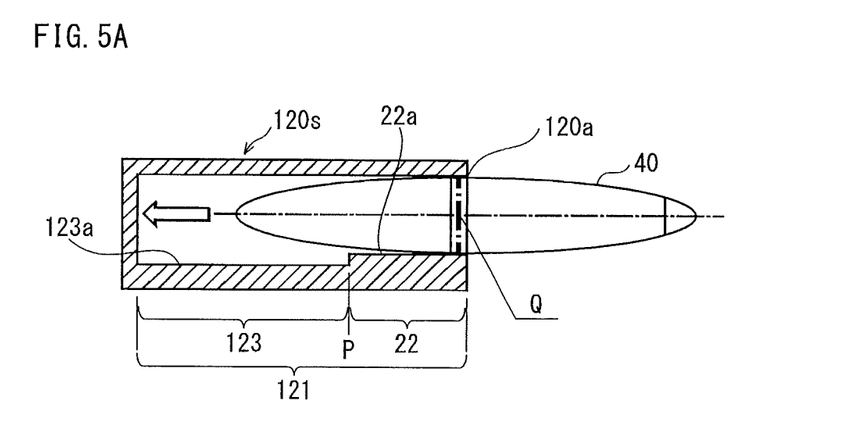
FIGS. 5A and 5B are schematic diagrams illustrating how the stylus pen slants when stored in a modification to the storage section according to an embodiment of the present invention.
Figure 5B:
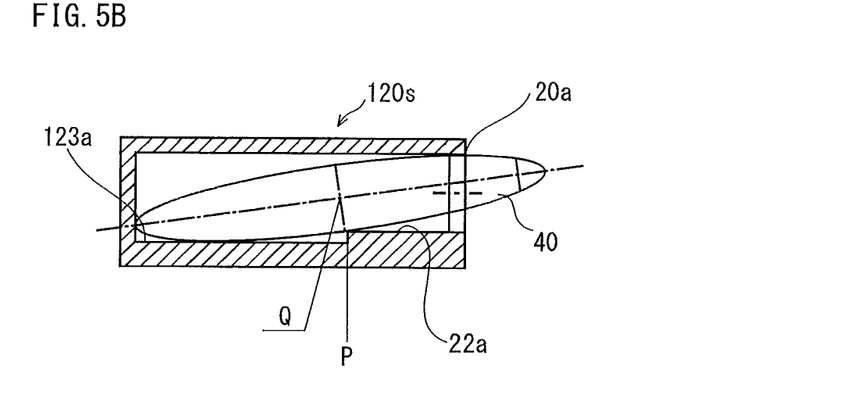

FIGS. 5A and 5B are diagrams illustrating how the stylus pen 40 slants when stored in a pen holder 120s in which the shape of the storage section 21 has been modified. Structural components that are the same as the storage section 21 are provided with the same labels.

As illustrated in FIG. 5A, in a second hollow portion 123 of the pen holder 120s, a bottom 123a is at a lower position than the bottom 22a and is parallel to the horizon. In other words, a step exists between the bottom 22a and the bottom 123a.

Like the storage section 21 in the above embodiment, this structure can also store the stylus pen 40.

In further detail, when the stylus pen 40 is inserted in the opening 20a as illustrated in FIG. 5A, the stylus pen 40 first proceeds along the bottom 22a of the first hollow portion 22, then entering the second hollow portion 123 whose bottom 123a is lower than the bottom 22a. Subsequently, once the center of gravity Q of the stylus pen 40 passes the boundary P between the bottom 22a and the bottom 123a, as illustrated in FIG. 5B, the stylus pen 40 slants, with the tip of the stylus pen 40 pointing downwards. The center of gravity Q thus moves to a lower position. The tip then comes into contact with a sidewall 123b in the second hollow portion 123, so that the stylus pen 40 is set in position along the x-axis. At this point, storage is complete.

(2) In the above embodiment, the tip of the stylus pen 40 comes into contact with the side wall 23b of the second hollow portion 23 so that the stylus pen 40 is set in position along the x-axis, but the present invention is not limited in this way.

Figure 6:
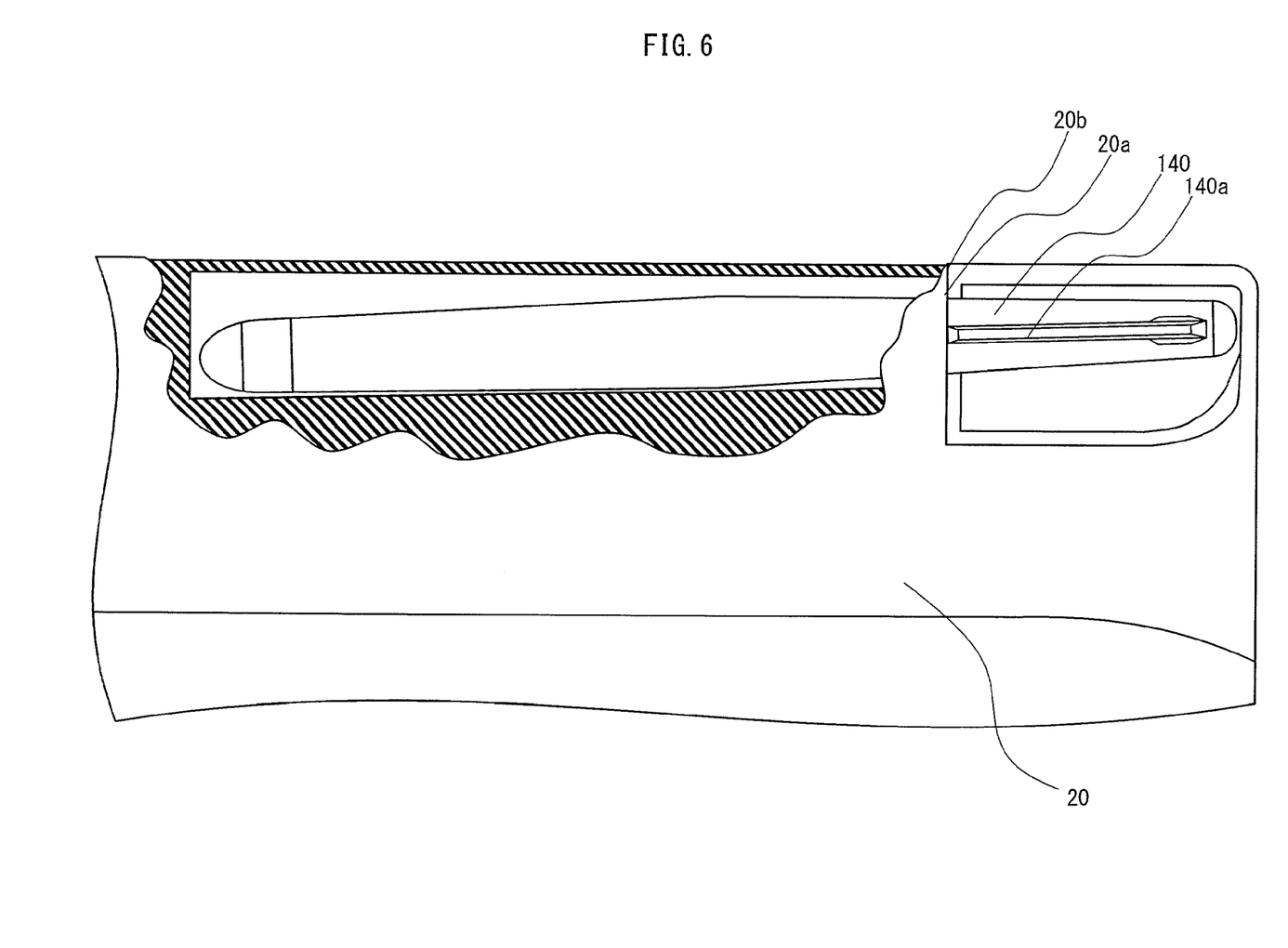
FIG. 6 is a diagram illustrating a modification to the stylus pen according to an embodiment of the present invention.

For example, as illustrated in FIG. 6, a stylus pen 140 in which a clip 140a is attached to the back end of the stylus pen 40 may be adopted. The insertion depth along the x-axis may then be regulated by the tip of the clip 140a coming into contact with a sidewall 20b surrounding the opening 20a.

(3) In the above embodiment, adoption of an aspect of the present invention in a copier has been described, but an aspect of the present invention may also be adopted in a printer, a facsimile machine, or the like. In other words, an aspect of the present invention may be used in any image forming apparatus provided with a touchscreen operation panel.

Insofar as possible, the above embodiment and modifications may be combined with one another.

SUMMARY

The above embodiment and modifications are one aspect of the present invention for solving the problems discussed in the Description of the Related Art. The above embodiment and modifications may be summarized as follows.

An image forming apparatus according to an aspect of the present invention comprises an operation panel receiving instructions from a user by touch operations; a stylus pen used to perform the touch operations; and a pen holder holding the stylus pen, the pen holder including an opening for insertion of the stylus pen from outside of the pen holder, and a storage section storing the stylus pen, wherein the storage section includes a first hollow portion with a first bottom and a second hollow portion with a second bottom lower than the first bottom, and the stylus pen is stored in the storage section by being inserted through the opening, proceeding along the first bottom to enter the second hollow portion, and slanting, upon a center of gravity of the stylus pen passing a boundary between the first bottom and the second bottom, so that a tip of the stylus pen points downwards.

The first bottom may be horizontal, and the second bottom may be inclined downwards with respect to the horizon.

The above image forming apparatus according to an aspect of the present invention may further comprise a main body to which the operation panel is attached, wherein the pen holder is provided in the main body at a location near where the operation panel is attached.

An end of the stylus pen opposite the tip may project out from the opening when the stylus pen is held in the pen holder.

The stylus pen may have a terminal section with an outer diameter that progressively decreases from the center of gravity to an end of the stylus pen opposite the tip.

The operation panel may include a main body and a display overlapping the main body. The display may be slidable left and right, as viewed from a front of the image forming apparatus, between a first position and a second position, the main body and the display being in greater overlap in the first position than in the second position. The pen holder may be configured so that the stylus pen is withdrawn in a direction opposite to the direction in which the display slides from the first position to the second position.

As viewed from a front of the image forming apparatus, the stylus pen may project out to the right.

With the above structure, the stylus pen is stored by being inserted into the pen holder through the opening, so that only a small portion of the stylus pen is exposed. This reduces the risk of detracting from the appearance as compared to when the entire stylus pen is exposed.

Furthermore, when inserted into the pen holder, the stylus pen passes along the first hollow portion, enters the second hollow portion with the second bottom lower than the first bottom, and slants, upon the center of gravity of the stylus pen passing the boundary between the first bottom and the second bottom, so that the tip of the stylus pen points downwards. This makes it difficult for the stylus pen to fall out of the storage section due to a force produced, for example, by vibration of the image forming apparatus.

By slanting due to the effect of gravity, the stylus pen is held stably in the storage section without being clamped by another member. This makes it easy to store and extract the stylus pen, thus offering excellent usability.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus comprising:
   an operation panel receiving instructions from a user by touch operations;

a stylus pen used to perform the touch operations; and
a pen holder holding the stylus pen, the pen holder including an opening for insertion of the stylus pen from outside of the pen holder, and a storage section storing the stylus pen, wherein
the storage section includes a first hollow portion with a first bottom, and a second hollow portion with a second bottom lower than the first bottom, and
the stylus pen is stored in the storage section by being inserted through the opening, proceeding along the first bottom to enter the second hollow portion, and slanting, upon a center of gravity of the stylus pen passing a boundary between the first bottom and the second bottom, so that a tip of the stylus pen points downwards.

2. The image forming apparatus of claim 1, wherein
the first bottom is horizontal, and
the second bottom is inclined downwards with respect to the horizon.

3. The image forming apparatus of claim 1, further comprising:
a main body to which the operation panel is attached, wherein
the pen holder is provided in the main body at a location near where the operation panel is attached.

4. The image forming apparatus of claim 1, wherein an end of the stylus pen opposite the first end projects out from the opening when the stylus pen is held in the pen holder.

5. The image forming apparatus of claim 1, wherein the stylus pen has a terminal section with an outer diameter that progressively decreases from the center of gravity to an end of the stylus pen opposite the first end.

6. The image forming apparatus of claim 3, wherein
the operation panel includes a main body and a display overlapping the main body,
the display is slidable left and right, as viewed from a front of the image forming apparatus, between a first position and a second position, the main body and the display being in greater overlap in the first position than in the second position, and
the pen holder is configured so that the stylus pen is withdrawn in a direction opposite to the direction in which the display slides from the first position to the second position.

7. The image forming apparatus of claim 4, wherein as viewed from a front of the image forming apparatus, the stylus pen projects out to the right.

8. An image forming apparatus comprising:
an operation panel receiving instructions from a user by touch operations of a stylus pen;
a pen holder holding the stylus pen, the pen holder including an opening for insertion of a first end of the stylus pen from outside of the pen holder, and a storage section storing the stylus pen, wherein
the storage section is elongated along a longitudinal axis and includes a first hollow portion and a second hollow portion extending along the longitudinal axis, with the first hollow portion arranged between the opening and the second hollow portion,
the first hollow portion includes a first bottom surface extending along the longitudinal axis of the storage section and the second hollow portion includes a second bottom surface extending along the longitudinal axis of the storage section, and the first bottom surface is not coplanar with the second bottom surface, and
the storage section being constructed such that when the stylus pen is stored in the storage section by the first end being inserted through the opening, when a center of gravity of the stylus pen is over the second bottom surface, the first end of the stylus pen points downwards.

9. The image forming apparatus of claim 8, wherein
the first bottom surface is horizontal, and
the second bottom surface is inclined downwards with respect to the horizon.

10. The image forming apparatus of claim 8, wherein the first bottom surface is parallel with the second bottom surface.

11. The image forming apparatus of claim 10, wherein the first bottom surface and the second bottom surface are horizontal.

12. An image forming apparatus comprising:
an operation panel receiving instructions from a user by touch operations of a stylus pen, the stylus pen having a first end, a second end, a longitudinal axis, and a center of gravity at a point between the first end and the second end; and
a pen holder, the pen holder including an opening for insertion of the stylus pen from outside of the pen holder, and a storage section for storing the stylus pen, wherein:
the storage section includes, a longitudinal axis, a first hollow portion adjacent the opening and having a first bottom, and a second hollow portion with a second bottom lower than the first bottom, the first hollow portion being arranged between the opening and the second hollow portion along the longitudinal axis, and the first bottom is not coplanar with the second bottom, and
the storage section being constructed such that when the stylus pen is stored in the storage section by the first end being inserted through the opening, and when the center of gravity of the stylus pen is over the second bottom, a tip at the first end of the stylus pen points downwards.

13. The image forming apparatus of claim 12, wherein:
the first bottom is horizontal, and
the second bottom is inclined downwards with respect to the horizon.

14. The image forming apparatus of claim 12, wherein the first bottom is parallel with the second bottom.

15. The image forming apparatus of claim 14, wherein the first bottom and the second bottom are horizontal.

16. The image forming apparatus of claim 1, wherein the storage section includes a substantially horizontal longitudinal axis, the first hollow portion is adjacent the opening, and the first hollow portion is arranged between the opening and the second hollow portion along the longitudinal axis.

17. The image forming apparatus of claim 1, wherein the pen holder is configured such that when the center of gravity of the stylus pen is located over the second bottom, the tip of the stylus pen points downwards.

18. The image forming apparatus of claim 1, wherein the second hollow portion is longer than the first hollow portion.

19. The image forming apparatus of claim 8, wherein the second hollow portion is longer than the first hollow portion along the longitudinal axis.

20. The image forming apparatus of claim 12, wherein the second hollow portion is longer than the first hollow portion along the longitudinal axis.

* * * * *